United States Patent [19]

Komanduri et al.

[11] 4,074,471

[45] Feb. 21, 1978

[54] PROCESS FOR NUCLEATING DIAMONDS

[75] Inventors: Rangachary Komanduri; Milton C. Shaw, both of Pittsburgh, Pa.

[73] Assignee: Carnegie-Mellon University, Pittsburgh, Pa.

[21] Appl. No.: 657,891

[22] Filed: Feb. 13, 1976

Related U.S. Application Data

[63] Continuation of Ser. No. 514,394, Oct. 15, 1974, abandoned.

[51] Int. Cl.² .................. B01J 3/06; C01B 31/06
[52] U.S. Cl. .................. 51/295; 51/307; 423/446
[58] Field of Search .......... 423/445, 446; 51/295, 51/309, 307

[56] References Cited

U.S. PATENT DOCUMENTS

| | | | |
|---|---|---|---|
| 2,947,609 | 8/1960 | Strong | 51/309 |
| 2,947,610 | 8/1960 | Hall et al. | 51/309 |
| 3,305,331 | 2/1967 | Inoue | 51/298 |
| 3,402,035 | 9/1968 | Martin | 51/298 |
| 3,436,183 | 4/1969 | Wakatsuki | 423/446 |
| 3,442,615 | 5/1969 | Wakatsuki et al. | 423/446 |
| 3,655,340 | 4/1972 | Kuratomi | 423/446 |
| 3,664,819 | 5/1972 | Siqui et al. | 51/298 |
| 3,743,703 | 7/1973 | Prikhna | 423/446 |
| 3,819,814 | 6/1974 | Pope | 423/446 |
| 3,874,856 | 4/1975 | Leeds | 51/298 |
| 3,924,031 | 12/1975 | Nicholas et al. | 51/295 |
| 3,969,489 | 7/1976 | Wu | 423/446 |

OTHER PUBLICATIONS

"New Methods of Nucleating Diamonds", Nature, vol. 248, pp. 582 – 584, Apr. 12, 1974, Komanduri et al.

*Primary Examiner*—Donald J. Arnold
*Attorney, Agent, or Firm*—Buell, Blenko & Ziesenheim

[57] ABSTRACT

The specification discloses nucleating diamonds in the absence of an external container. Nickel and graphite are subjected to high temperature and pressure, e.g., by a grinding process, sufficient to cause diamond nuclei to be formed.

4 Claims, 3 Drawing Figures

PROCESS FOR NUCLEATING DIAMONDS

This application is a continuation of our application Ser. No. 514,394, filed Oct. 15, 1974 now abandoned.

This invention relates to the production of synthetic diamonds by nucleation outside of any autoclave or pressure vessel. More particularly it relates to nucleation of diamonds by generation of high pressures and temperatures in localized areas.

The production of synthetic diamonds is well known and they have substantial industrial importance. Synthetic diamonds are used, for example, for grinding a wide range of materials including stone, glass, ceramics, cemented tungsten carbides and more recently even hard tool steels. In many instances synthetic diamonds are even more effective than the natural product due to the possibility of providing the desired level of friability and toughness for a given application by altering manufacturing conditions. In addition, it is advantageous to be able to control grain size without resorting to crushing operations that induce unwanted and uncontrolled imperfections.

The synthesis of diamonds from graphite in the size range under 0.1 mm. to about 1.0 mm. requires an ultraautoclave capable of operating at pressures and temperatures in the vicinity of 100,000 atmospheres and 2000°K. In addition, a molten metal solvent-catalyst is required so that the conversion of graphite to diamond may be achieved in a relatively short time measured in minutes. Catalysts employed include chromium, manganese and tantalum plus all elements of group VIII of the periodic table, but nickel is used most frequently. The cross hatched area of FIG. 1 shows the combinations of pressure and temperature required when nickel is used as a catalyst.

It has been found advantageous to use metal coated diamonds in resin bonded wheels when grinding relatively ductile materials such as cemented tungsten carbides or hard tool steels. Nickel coated grains are most commonly used for wet grinding, and about 55% of the weight of diamond is deposited as nickel which corresponds to a 15% increase in volume or an increase in diameter of about 15%. In addition to providing a larger area for bonding, the metal coating is believed to promote heat transfer away from the wheel surface and to retain particles in the wheel face when grains fracture due to mechanical shock or thermal fatigue. In addition to such thermal and mechanical influences the metal coating could act to decrease wear by a chemical mechanism.

At atmospheric pressure diamond represents an unstable form of carbon which will tend to transform to graphite if the temperature is sufficiently high, and the soft transformed graphite will be rapidly worn away. A very thin coating of nickel will smear over the surface of an active coated diamond grain and in so doing could alter the rate of wear by actually changing the equilibrium between the conversion of diamond to graphite and the conversion of graphite to carbon. Local conditions at the tip of the abrasive grain will be in the range of those found in the apparatus used to synthesize diamond from graphite in the presence of nickel.

In surface grinding extremely high energies are dissipated in a small area. It has been shown that the surface temperatures developed may be well above the melting point of the metal being ground. The temperature rise is of such short duration, however, that melting of the metal does not occur.

Figure 1:
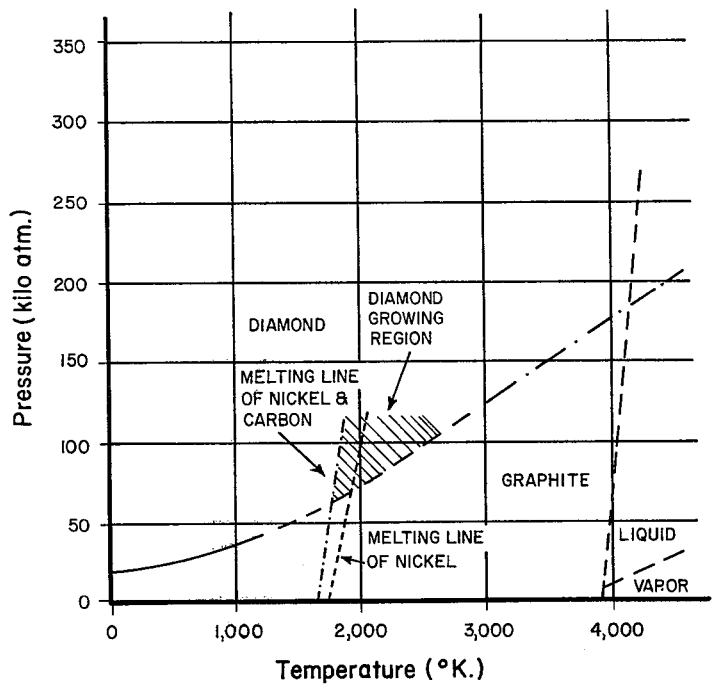
FIG. 1 is a graph showing the combinations of pressure and temperature required when nickel is used as a catalyst.

It is estimated that when grinding steel, surface temperatures of the order of 3000° are obtained with grain-chip contact pressures as high as $2 \times 10^6$ psi (130 kiloatmospheres). This condition is marked by an "X" on FIG. 1, It will be seen that the condition exceeds the range of operation of that employed in diamond synthesis (cross hatched region). It is to be expected that under such extreme conditions the diamond nuclei produced will be extremely small, closely spaced and spontaneously formed.

The extreme conditions found at the tip of a cutting tool have been used previously to promote chemical reactions in organic synthesis in the process known as mechanical activation. When magnesium is cut under the surface of a halide in the presence of the solvent-catalyst ethyl ether it is possible to form Grignard reagents that are impossible to initiate when using previously made magnesium turnings. The very high temperatures and pressures existing at the tool tip constitute autoclave conditions without need for an actual autoclave. This together with the unique cleanliness of the nascent surfaces generated causes an immediate reaction to occur which is of great importance with organometallic reactions that are autocatalytic such as those of the Grignard type. When conventional procedures are employed, either a long indefinite induction period is required or the reaction fails to go altogether.

Figure 3:
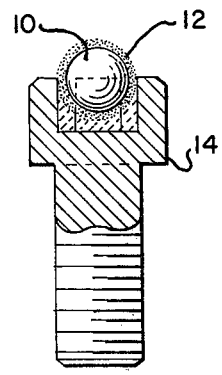
FIG. 3 is an enlarged view of the abrasive grain carrier partly in section as shown in FIG. 2.
Figure 2:
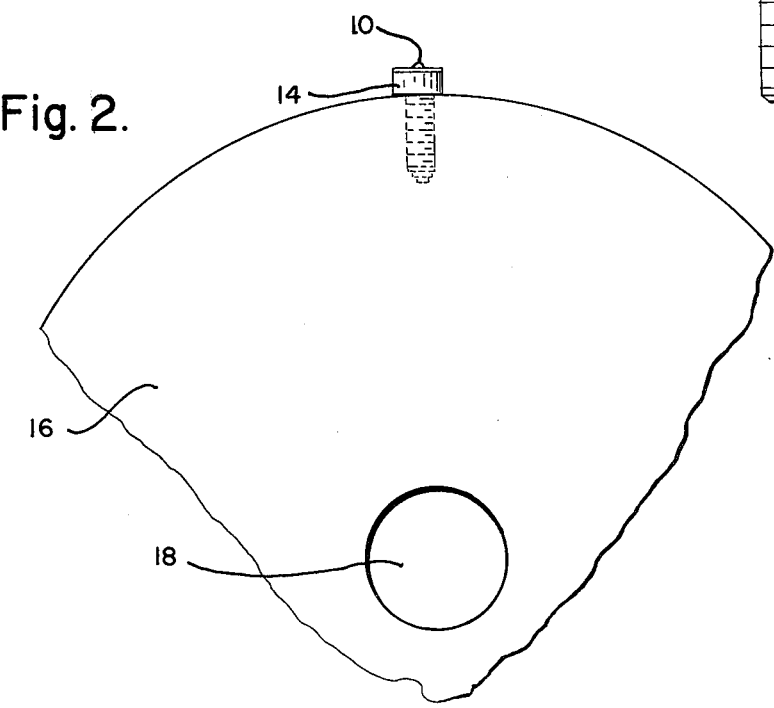
FIG. 2 is a fragmentary section of the test structure.

In order to test the feasibility of generating diamond nuclei at the tip of an abrasive grain the following experiment was performed. It should be understood that the conventional abrasive grain can include tungsten carbide or diamond. Referring to FIGS. 2 and 3, a tungsten carbide sphere 10, 1.5 mm in diameter, was coated with layers of nickel and graphite 12, the nickel serving as a catalyst. The sphere 10 was first cleaned by sputter etching and then three thin layers were deposited in the order nickel-carbon-nickel 12 using a sequential sputtering apparatus.

The coated tungsten carbide sphere 10 was then cemented into a hollow head screw 14 which in turn was threaded radially into the surface of an 8 inch (20 cm) diameter aluminum disc 16. The disc was mounted on the spindle 18 of a surface grinding machine in place of the usual grinding wheel and used to cut a groove in a piece of hardened ball bearing steel (AISI 52100 steel of hardness $R_c61$). The speed of the disc (V) was in the range of conventional grinding (6000 fpm or 30 m/sec) while the table speed ($v$) and depth of cut ($d$) were adjusted to provide individual chips that were comparable in size to those in ordinary surface grinding ($v = 6$ ipm or 2.54 mm/sec and $d = 0.001$ in or 25 u). The length of groove produced was 0.5 inches (12.5 mm) which corresponds to 250 individual cuts.

The tungsten carbide sphere 10 acted like an abrasive grain in the surface of a grinding wheel and produced individual chips that were projected into the atmosphere as sparks.

After cutting a small flat was found on the tip of the tungsten carbide sphere 10. When the worn surface of the composite coating was examined in a scanning electron microscope for evidence of diamond nuclei, many small nucleation sites about a micron in diameter were evident at the inner nickel layer. It has previously been reported that in the synthesis of diamonds actual transformation from carbon to diamond occurs in a very thin layer of nickel that separates the carbon from the diamond. The nuclei which we observed were produced in a thin nickel layer and are believed to be diamond nuclei generated under the extreme conditions of temperature and pressure which are generated during cutting.

An effort was made to confirm the presence of a diamond by X-ray diffraction. Tungsten carbide, titanium carbide, and nickel patters were clearly evident. In addition, one spot (corresponding to the strongest diamond line) was also found.

A comparable specimen was abraded by hand using a fine abrasive paper (4/0 silicon carbide) at low speed. Accordingly no high temperatures were generated. Electron microscopy failed to show any nuclei in that specimen.

It is believed that diamonds can be generated by nucleation external to an autoclave. The generation of diamond nuclei at the tip of an abrasive again offers various advantages. The process may be used to reduce the rate of wear of a diamond grinding wheel. It is thought that a thin layer of nickel which smears over the surface of a worn coated diamond in a grinding wheel can act to prevent the diamond surface from being converted to graphite. Or, some of the graphite formed by degradation of diamond during wear may be reconverted to diamond if nickel is present. The presence of nickel would thus alter the net rate of conversion of diamond to graphite. That indicates the desirability of providing a source of graphite in the diamond grain tip. Graphite could be provided in several ways:

a. By use of a nickel-graphite composite grain coating instead of nickel alone.
b. By use of a graphite bonded diamond wheel or a resin bond containing graphite.
c. By use of a graphite containing grinding fluid.
d. By impregnating the voids of the wheel with nickel and graphite in the case of a vitrified bonded wheel.

The process may serve as a source of diamond seeds for epitaxial growth. Such epitaxial growth at atmospheric pressures has been reported by others and could be carried out using diamond seeds produced by nucleation. For example such a process might be used to generate grinding wheel abrasives.

Also the process might be used as a basis for studying the formation of high temperature, high pressure stable phases of materials.

While we have described our invention with certain present preferred aspects of it, it is to be understood that we do not limit ourselves thereto and that our invention may be otherwise variously practiced within the scope of the following claims.

We claim:

1. A process for nucleating diamonds in the absence of a pressure vessel which comprises:
   (a) depositing a mixture of a metal solvent catalyst for forming diamond from graphite and graphite on an abrasive grain which provides a hard substrate which is at least as hard as tungsten carbide; and
   (b) subjecting the coated abrasive grain to a grinding action with a work material which produces the necessary temperature and pressure to form diamond.

2. A process for nucleating diamonds in the absence of a pressure vessel which comprises:
   (a) depositing a mixture of a metal solvent catalyst for forming diamond from graphite and graphite on an abrasive grain which is selected from the group consisting of tungsten carbide and diamond which provides a hard substrate; and
   (b) subjecting the coated abrasive grain to a grinding action with a work material which produces the necessary temperature and pressure to form diamond.

3. A process for nucleating diamonds in the absence of a pressure vessel which comprises:
   (a) depositing a mixture of nickel catalyst for forming diamond from graphite and graphite on an abrasive grain which provides a hard substrate; and
   (b) subjecting the coated abrasive grain to a grinding action with a work material which produces the necessary temperature and pressure to form diamond.

4. A process for nucleating diamonds in the absence of a pressure vessel which comprises:
   (a) depositing a mixture of a nickel catalyst for forming diamond from graphite and graphite on an abrasive grain selected from the group consisting of tungsten carbide and diamond which provides a hard substrate; and
   (b) subjecting the coated abrasive grain to a grinding action with a work material which produces the necessary temperature and pressure to form diamond.

* * * * *